US007158543B1

(12) United States Patent
Garakani et al.

(10) Patent No.: US 7,158,543 B1
(45) Date of Patent: Jan. 2, 2007

(54) V.8BIS SUPPRESSION METHOD AND APPARATUS FOR MODEM RELAY

(75) Inventors: Mehryar Khalili Garakani, Westlake Village, CA (US); Herbert M. Wildfeuer, Santa Barbara, CA (US); Gavin Jin, Santa Barbara, CA (US); Chieh-Wen Tsai, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 558 days.

(21) Appl. No.: 10/112,367

(22) Filed: Mar. 29, 2002

(51) Int. Cl.
*H04J 3/12* (2006.01)
*H04B 1/38* (2006.01)
*H04M 3/00* (2006.01)

(52) U.S. Cl. .................. 370/526; 375/222; 379/283; 379/386

(58) Field of Classification Search ............. 370/236, 370/352–356, 392, 401, 525, 526; 379/77, 379/80.87, 88.01, 88.03, 88.07, 88.17, 88.18, 379/88.23, 88.24, 93.01, 93.05–93.06, 93.08, 379/93.28, 93.29, 93.31, 93.35, 281, 282, 379/283, 284, 287, 386; 375/222
See application file for complete search history.

(56) References Cited

U.S. PATENT DOCUMENTS

| 5,227,741 | A  | * | 7/1993  | Marchetto et al. | ......... | 332/100 |
| 6,128,370 | A  | * | 10/2000 | Barazesh et al.  | ............. | 379/31 |
| 6,400,709 | B1 | * | 6/2002  | Yousseff         | .................... | 370/352 |
| 6,757,367 | B1 | * | 6/2004  | Nicol            | ........ | 379/90.01 |
| 6,785,371 | B1 | * | 8/2004  | Olafsson         | ................. | 379/93.35 |
| 6,799,210 | B1 | * | 9/2004  | Gentry et al.    | .............. | 709/223 |
| 6,985,481 | B1 |   | 1/2006  | Brent et al.     |          |          |

| 2002/0176401 | A1 | * | 11/2002 | Ryan et al. | .............. | 370/352 |

OTHER PUBLICATIONS

Telecommunications Standardization Sector of ITU, "ITU-T V.8 bis Series V: Data Communication Over The Telephone Network", (Sep. 1998).*
Telecommunications Standardization Sector of ITU, "ITU-T V.8 bis Series V: Data Communication Over The Telephone Network", (Sep. 1998).*

(Continued)

*Primary Examiner*—Seema S. Rao
*Assistant Examiner*—John Shew
(74) *Attorney, Agent, or Firm*—Marger Johnson & McCollom, P.C.

(57) ABSTRACT

The invented method involves one or more gateways sniffing the voice channel during the voice mode. If it is determined that V.8bis signals are being initiated, then the gateway breaks these exchanges by suppressing such signaling, thereby avoiding the above-described detrimental effects. Modem relay communications then are allowed to proceed. Briefly, the method and apparatus involve monitoring a call during a voice mode phase for an initiating signal representative of the defined signaling, the monitoring being performed by a local gateway and, if such an initiating signal is detected during the monitoring, then suppressing such detected signaling in such manner that the signaling does not reach the remote gateway. Preferably, the monitoring is for an initiating signal characterized by a dual tone of defined frequency and duration of approximately 1375 Hz and 2002 Hz for a duration of approximately 400 ms or 285 ms, in agreement with the ITU-T Recommendation V.8bis (standard) adopted by the International Telecommunication Union. Monitoring is continued at least until an answer back from an answering station is received by the gateway. When the suppression succeeds and the remote (non-initiating gateway that may be awaiting such an initiating signal halts any further V.8bis transaction attempts, the local gateway initiates a modem relay session of operation with the remote gateway.

20 Claims, 2 Drawing Sheets

OTHER PUBLICATIONS

Telecommunications Standardization Sector of ITU, "ITU-T V.8 bis Series V: Data Communication Over The Telephone Network", (Sep. 1998).*

ITU-T, Telecommuncations Standardization Sector of ITU, V.8 bis, Series V: Data Communication Over the Telephone Network, Sep. 1998.

* cited by examiner

V.8BIS SUPPRESSION METHOD AND APPARATUS FOR MODEM RELAY

BACKGROUND OF THE INVENTION

The present invention relates generally to voice frame network systems such as Voice over Internet Protocol (VoIP) systems for concurrently carrying both voice and data signals, and more particularly it concerns method and apparatus for suppressing disruptive V.8bis negotiations during the startup phase of modem relay communication between two gateways. V.8bis herein refers generally to the historic and continually evolving ITU-T Recommendation V.8bis (standard) adopted by the International Telecommunication Union, familiarity with which is assumed.

Immediately below are a few definitions related to V.8bis:

V.8bis Signal: V.8bis information sent via tones.

Initiating Signal: A V.8bis signal, which initiates a V.8bis transaction.

Responding Signal: A V.8bis signal that is sent in response to an initiating signal.

V.8bis Message: V.8bis framed information sent at 300 bits/sec using V.21 channels.

V.8bis Transaction: A sequence of V.8bis signals and messages, beginning an initiating signal and terminating with either a positive acknowledgement, a negative acknowledgement or a timeout.

Answering Station: Client device that answers a PSTN call.

Calling Station: Client device which originates a PSTN call.

Initiating Station: Client device which initiates a V.8bis transaction, may be either the Answering or Calling Station.

Responding Station: Client device that responds to the initiator of a V.8bis transaction.

V.8bis-capable modems can exchange V.8bis transactions during call establishment phase or subsequently at later points during the "voice mode" (before transitioning the channel into "modem relay" mode).

The V.8bis capability is optional and only some modems presently support it. V.8bis transactions use signals or messages that are transmitted with adequate fidelity across a wide range of voice codes.

If both client devices are V.8bis capable, the V.8bis transactions would proceed during the voice mode (prior to Answer tone). These transactions result in complications and potential disruption. For example, the transactions might:

a) Modify subsequent V.8 procedures. For example, shorten the V.8 startup by eliminating V.8 CM. Eliminating CM is detrimental, since it is a trigger into modem relay mode, and having it eliminated can fail successful transactions into modem relay mode.

Additionally:

b) Some high speed proprietary modulations (prior to V.90) use V.8bis negotiations. This means V.8bis negotiations might result in client devices configuring themselves for a proprietary high-speed modulation, which may not be supported on most modem relay gateways. In the latter case, there would be call failure.

As noted above, the V.8bis procedures are optional and occur only when both client devices are capable. Hence, these procedures are not required to achieve successful modem calls (since there is no guarantee both devices are capable). However, they can have a number of detrimental effects on mode relay operation, significantly complicating modem relay gateway implementation.

SUMMARY

The invented method involves one or more gateways sniffing the voice channel during the voice mode. If it is determined that V.8bis signals are being initiated, then the gateway breaks these exchanges by suppressing such signaling, thereby avoiding the above-described detrimental effects. Modem relay communications then are allowed to proceed. Briefly, the method and apparatus involve monitoring a call during a voice mode phase for an initiating signal representative of the defined signaling, the monitoring being performed by a gateway and, if such an initiating signal is detected during the monitoring, then suppressing such detected signaling in such manner that the signaling does not reach the remote gateway. Preferably, the monitoring is for an initiating signal characterized by a dual tone of defined frequency and duration of approximately 1375 Hz and 2002 Hz for a duration of approximately 400 ms or 285 ms, in agreement with the ITU-T Recommendation V.8bis (standard) adopted by the International Telecommunication Union. Monitoring is continued at least until an answer back from an answering station is received by the gateway. When the suppression succeeds, this halts any further V.8bis transaction attempts, the local gateway initiates a modem relay session of operation with the remote gateway.

DETAILED DESCRIPTION OF THE EMBODIMENTS

There are a number of variations of V.8bis transaction scenarios that are possible, including exchanges prior to answer tone or at any other time during the voice mode.

However, there is a commonality to all V.8bis transactions that can be utilized very effectively by the modem relay gateways. All transactions start with an exchange of so-called "initiating signals." Furthermore, all initiating signals may be characterized as including a period of dual tone at 1375 Hz and 2002 Hz followed by a period of single frequency tone that is specific to each signal. The duration of the dual tone is normally 400 ms (but may be shortened to 285 ms for some signals-see Section 7.1.2 of the V.8bis standard). The duration of the single frequency tone is 100 ms.

The above considerations suggest a simple and effective way for modem relay gateways to break V.8bis exchanges. The following technique has proven effective:

a) If the channel is enabled for modem relay, the gateways look for frequencies associated with initiating tones at all times when the channel is in voice mode (including prior to any answer back tone from the Answering Station).

b) If the gateways detect dual tones (1375 Hz and 2002 Hz) incoming on the telephony leg, they block transmitting the dual tone into the IP network. This means the dual tone would not be injected into the IP network. It also avoids having to further monitor the channel for single tones of diverse frequencies.

b) Because the dual tone from the Initiating Station would not reach the client device on the other side of the network, no V.8bis transactions can occur. The Initiating Station would interpret this as lack of V.8bis capability from the other client device and would terminate V.8bis and proceed with the rest of the modem relay handshake, as desired.

Figure 1:
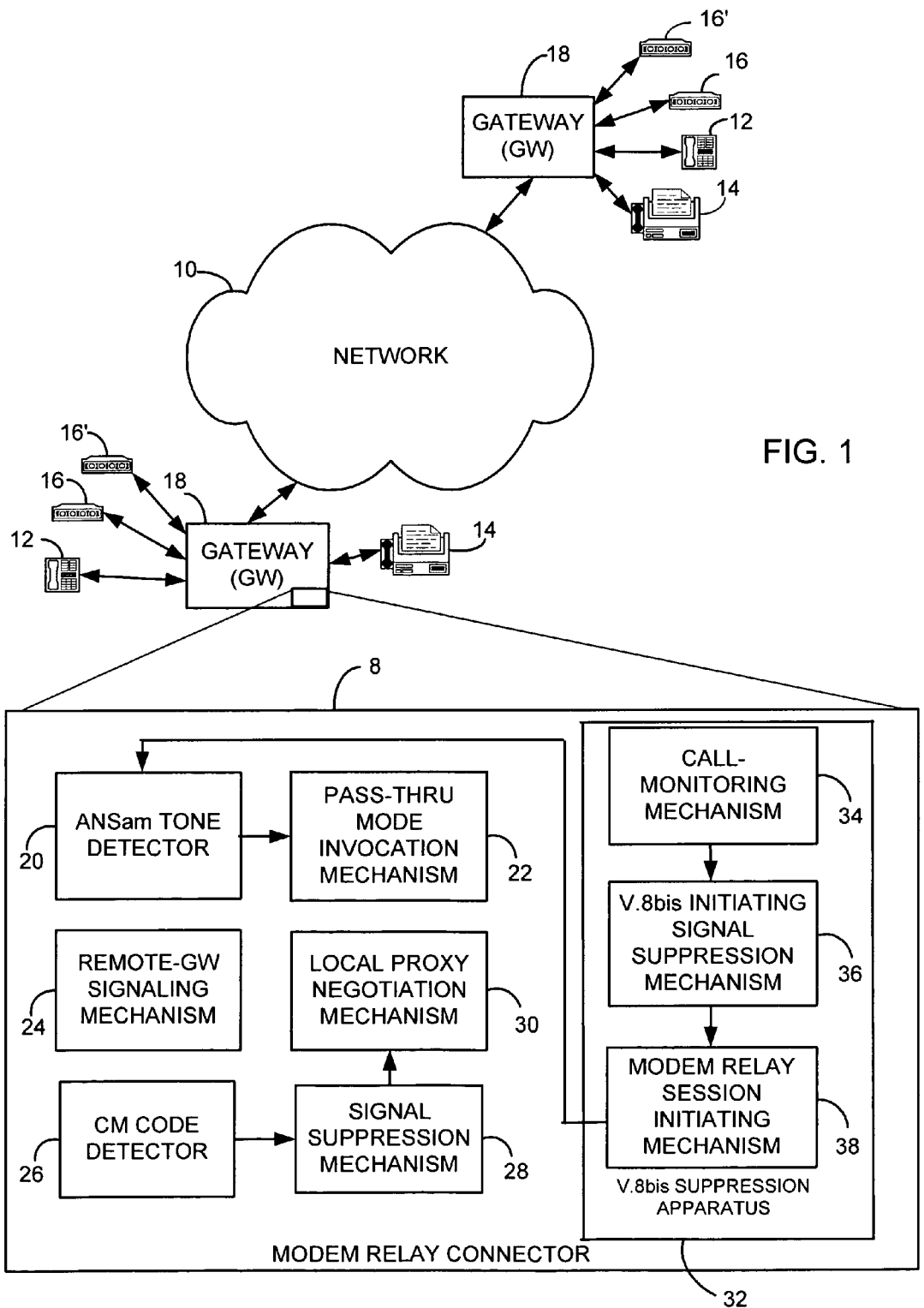
FIG. 1 is a system block diagram illustrating a VoIP network in which a modem relay connector and the invented suppression apparatus are featured in accordance with a preferred embodiment of the invention.

FIG. 1 illustrates the invented apparatus at 8 coupled with a network 10 operating with respect to voice traffic thereon in accordance with a voice packet protocol such as a voice over frame relay (VoFR) protocol or voice over Internet protocol (VoIP). Network 10 typically includes one or more telephone handsets 12, one or more fax machines 14 and one or more low-speed modems 16 representing different traffic demands on network 10 due to their diverse bandwidth requirements. The faxes 14 and low-speed modems 16 may share telephone numbers with the telephone handsets to provide facsimile, e-mail and Internet service to users/clients. High-speed modems 16' having data rates of 32 kbits/second (kbps) or higher are typically provided.

Handsets 12 communicating voice typically require bit rates of approximately 8k–64 kbps over the IP network. Typically, plural handsets 12 are connected with each one of plural voice gateways 18 representing so-called endpoint nodes within network 10. Handsets 12 will be understood to be used for voice communication, whereby voice signals are digitized, packetized and transmitted bi-directionally during a telephone conversation. In a voice frame network like network 10, concurrent with voice traffic over the network is the presence of an increasing volume of data traffic.

Those of skill in the art will appreciate that data and voice traffic are compatible to some extent because both are represented in network 10 in digital form. But voice and data traffic have different requirements, especially under increasing traffic demands. For example, voice traffic requires low latency because of the need for immediate feedback or other form of acknowledgement in a two-way human conversation. In voice mode, VoIP channels using RTP or other low-latency protocols represent an unreliable transport for high-speed signaling between high-speed modems 16'. Conventionally, in a VoIP network 10, high-speed modems 16' would have negotiated an end-to-end physical layer, e.g. V.34, and gateways 18 would have been passive enablers of the resulting voice mode VoIP connection which may be subject to high packet drop rates resulting in frequent retrains.

One solution to the problem described above is described in co-pending U.S. application Ser. No. 09/728,430 filed Nov. 30, 2000 and subject to common ownership herewith by Cisco Technology, Inc. The solution proposed therein is to terminate the physical layer, e.g. V.34, at the VoIP gateway, and to packetized and transmit the demodulated data bit stream over the IP network to the peer gateway where it is reconstructed and forwarded to the receiving modem. This is referred to as a modem relay mode of operation. By monitoring physical layer negotiation between endpoints, it is determined whether the endpoints are modems negotiating a high-speed dial-up connection. If so, the VoIP gateways take over the end-to-end negotiation of the physical layer, terminating the physical layer locally on their adjacent telephony segment.

Modem relay startup must first determine that the originating and answering modems are high-speed modems through appropriate tone detection sensitive enough to distinguish low-speed modems 16 and fax 14 signals from high-speed modem 16' dial-up connections. It must then smoothly transition to modem relay mode at an appropriate time and in a non-disruptive manner during the sensitive end-to-end physical layer negotiation. Such may be accomplished in accordance with the teachings of the above-cited co-pending patent application or by any other suitable means, within the spirit and scope of the present invention.

The problem solved by the present invention is that, prior to such a modem relay connection being made, V.8bis traffic between the local and remote gateway or stations connected thereto can be disruptive. Thus, the invention proposes method and apparatus for suppressing such V.8bis traffic, thereby permitting the modem relay connection to be initiated at once even if the modems 16' involved in the modem relay connection utilize V.8bis signaling.

Referring again now to FIG. 1, apparatus 8 will be described in more detail. Apparatus 8, which may be thought of as including a modem relay connection mechanism or modem relay connector, includes an ANSam tone detector 20; a pass-through (pass-thru) mode invocation mechanism 22; and preferably also a remote-gateway (remote-GW) signaling mechanism 24. Apparatus 8 also includes a CM code detector 26; a signal suppression mechanism 28; and a local proxy negotiation mechanism 30. As will be understood from the above description, ANSam detector 20 may cause pass-through mode invocation mechanism 22 to disable voice compression, and possibly also echo cancellation, if either or both are determined to have been enabled. ANSam detector 20 also causes remote-GW signaling mechanism 24 to signal the remote gateway 18 connected to the far-end modem. Those of skill in the art will appreciate that it is not yet determined to a high degree of certainty that both modems are high-speed.

Upon detection of a CM code by code detector 26, the transition to modem relay mode may begin, since detection of a CM code by either gateway 18 indicates that a high-speed modem 16' has received an ANSam from another high-speed modem 16' in accordance with the V.34 protocol. Thus, CM code detector 26 causes a signal suppression mechanism 28 immediately to suppress further signals between high-speed modems 16', effectively terminating the end-to-end physical layer negotiations therebetween. Once signals have been suppressed—at what is referred to herein as a predeterminedly early time in the end-to-end negotiations—local proxy negotiation mechanism 30 transmits or detects consecutive CM codes, as described above, and then completes local physical layer negotiation in accordance with the high-speed, dial-up V.34 modem protocol.

Those of skill in the art will appreciate that, within the spirit and scope of the present invention, modem relay connector 8 may take alternative forms. The subject of the present invention is avoidance of disruptive V.8bis transactions between gateways that might make such a modem relay connection difficult or impossible to achieve. Thus, prior to detection of an answer tone, V.8bis traffic between gateways is suppressed during the voice phase of operation until answer tone detection represented as the first block of modem relay connector 8.

It is the invented method and apparatus by which potentially disruptive V.8bis transactions are suppressed that is the subject of the detailed description and claims that follow.

Referring still to FIG. 1, the illustrated apparatus may be seen further to include a V.8bis suppression apparatus 32, in accordance with the present invention. V.8bis suppression apparatus 32 includes a call-monitoring mechanism 34 for monitoring a call during a voice mode phase for an initiating signal representative of a V.8bis transaction. Such an initiating signal under V.8bis is typically characterized by a dual tone of predefined frequency and duration. V.8bis suppression apparatus 32 also includes a V.8bis initiating signal suppression mechanism 36 at the local gateway for suppressing such detected signaling such that the signaling does not reach the remote gateway. Finally, V.8bis suppression apparatus 32 includes a modem relay session initiating mechanism 38 at the local gateway for initiating a modem relay session with the remote gateway, which modem relay session initiating mechanism 38 may simply invoke modem relay connector 8 as illustrated.

Figure 2:
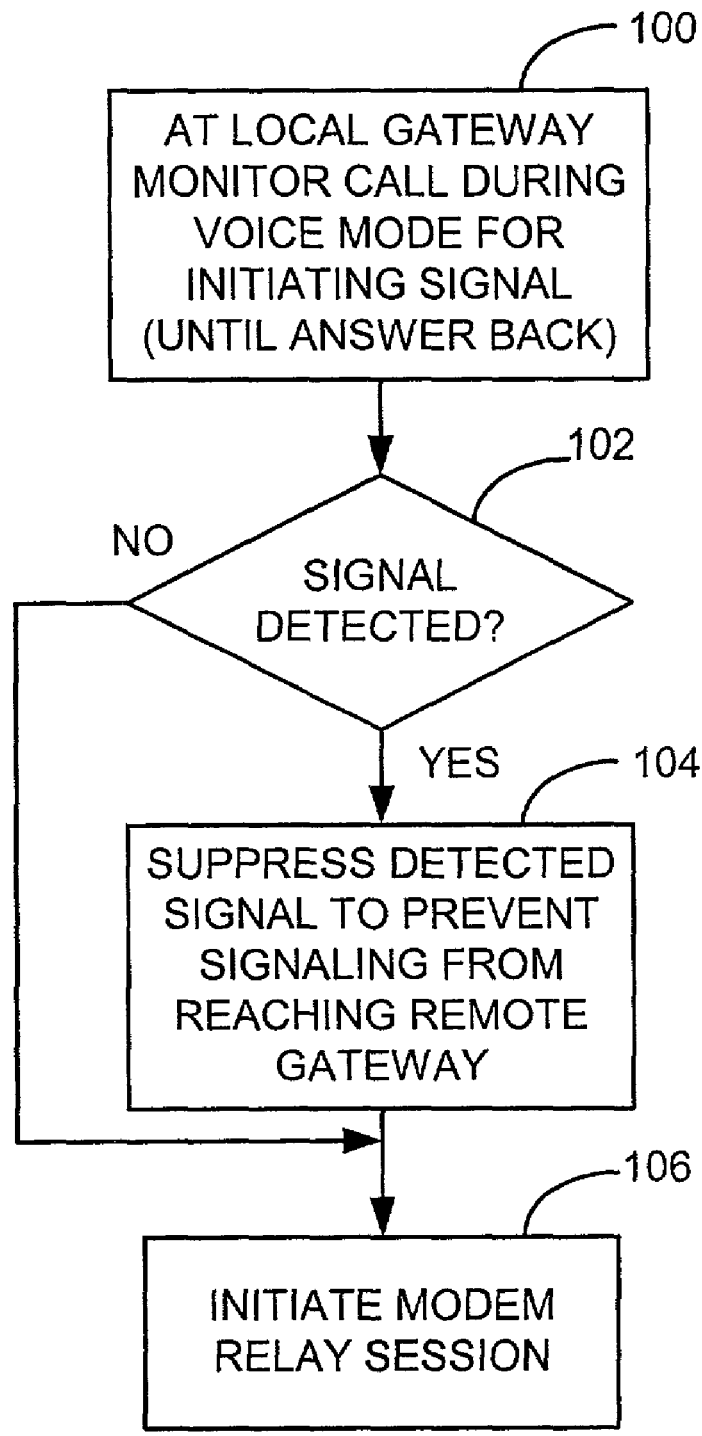
FIG. 2 is a flowchart of the suppression method for modem relay in accordance with a preferred embodiment of the invention.

Preferably, the invention is implemented in software. FIG. 2 illustrates one embodiment of the invented method of selectively suppressing a defined signaling at a modem relay gateway. The method includes a) at 100, monitoring a call during a voice mode phase for an initiating signal representative of the defined signaling, the monitoring being performed by a gateway, and b) at 102 determining whether an initiating signal representative of the defined signaling is detected during the monitoring, and, if so then c) at 104 suppressing such detected signaling in such manner that the signaling does not reach the remote gateway. As noted above, the monitoring is for an initiating signal characterized by a dual tone of defined frequency and duration. In accordance with the current V.8bis standard, the dual tone is at a frequency of approximately 1375 Hz and 2002 Hz and for a duration of approximately 400 ms (or, alternatively 285 ms). Because of the dual tone detection scheme embodied in the invented method and apparatus, detection of a V.8bis single frequency tone that may vary in frequency and duration is unnecessary.

It may be seen from FIG. 2 that the monitoring is continued at least until an answer back from an answering station is received by the gateway. It also will be appreciated that, after the suppression succeeds, this halts any further V.8bis transaction attempts, at 106, d) the local gateway initiates a modem relay session of operation with the remote gateway.

The invention is elegant in its simplicity. It greatly simplifies modem relay gateway design by avoiding support for proprietary speed modem modulations. Use of the invention also avoids the problems associated with shortening V.8 negotiation, e.g. by eliminating CM.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A system, comprising:
a first modem configured to operate a predetermined high speed modulation, the first modem to initiate a call having a call path that extends from the first modem, over a circuit switched network to a first gateway, and then from the first gateway over a packet switched network to a second gateway that is not configured to operate the predetermined high speed modulation, and then from the second gateway over a same or another circuit switched network to a second modem that is configured to operate the predetermined high speed modulation;
the first modem to initiate V.8bis signaling on the call path, the V.8bis signaling configured to elicit, from the second modem, a compatibility response indicating that the second modem is configured to operate the predetermined high speed modulation;
the first gateway to intercept the V.8bis signaling before reaching the second gateway and before an answer tone is established for the call;
the first gateway to determine that the intercepted V.8bis signaling is configured to elicit the compatibility response from the second modem when the V.8bis signaling includes a predetermined dual tone having a frequency of approximately 1375 Hz and 2002 Hz and a duration of approximately 285 ms to 400 ms;
the first gateway to block the predetermined dual tone included in the V.8bis signaling to prevent the predetermined dual tone from reaching the second gateway and the second modem thereby disrupting V.8bis signaling negotiations between the modems to prevent the modems from operating according to the predetermined high speed modulation during the call;
the second modem to receive configuration signaling that does not include the predetermined dual tone;
the second modem to send a different response that indicates that the second modem operates according to a different modulation than the predetermined high speed modulation, the different response sent in response to receiving the configuration signaling that does not include the predetermined dual tone; and
the first modem to operate according to the different modulation in response to receiving the different response and in response to the first gateway blocking the predetermined dual tone.

2. The system of claim 1 wherein the answered call is caused to operate according to the different modulation that operates independently of the predetermined high speed modulation thereby preventing the second gateway that is not configured to operate the predetermined high speed modulation from dropping the call or the answered call.

3. The system of claim 2 wherein blocking the predetermined dual tone prevents the second modem from sending the compatibility response indicating that the second modem is configured to operate the predetermined high speed modulation.

4. The system of claim 3 further comprising:
the first modem configured to observe the lack of the compatibility response as an indication that the second modem is not configured to operate the predetermined high speed modulation; and
the first modem to provide the different modulation in response to observing the lack of the compatibility response.

5. A method, comprising:
monitoring a call during a voice mode phase for an initiating signal representative of a V.8bis transaction, wherein said initiating signal initiates the V.8bis transaction to identify and select a proprietary high speed modulation between first and second modems, said monitoring being performed by a local gateway associated with the first modem;

if the initiating signal is detected during said monitoring, then suppressing the detected initiating signal in such manner that the initiating signal fails to reach both the second modem and a remote gateway that is associated with the second modem and that is incompatible with the detected V.8bis transaction and the proprietary high speed modulation;

and whether or not the initiating signal is detected, then at the local gateway initiating a modem relay session of operation with the remote gateway, the modem relay session using a different modulation that operates independently of the proprietary high speed modulation;

wherein the initiating signal is suppressed by the local gateway to prevent the first and second modems from communicating using the proprietary high speed modulation identified by the initiating signal.

6. The method of claim 5, wherein said monitoring is continuous for the duration of the voice mode phase at least until an answer back from an answering station is received by the local gateway.

7. The method of claim 5, wherein the initiating signal is characterized by a dual tone of defined frequency and duration.

8. The method of claim 7, wherein the dual tone is at a frequency of approximately 1375 Hz and 2002 Hz and for a duration of approximately 400 ms.

9. The method of claim 7, wherein the dual tone is at a frequency of approximately 1375 Hz and 2002 Hz and for a duration of approximately 285 ms.

10. An apparatus for initiating a modem relay session between a local and a remote gateway without V.8bis transaction interference, the apparatus comprising:
  a mechanism at the local gateway for monitoring a call during a voice mode phase for an initiating signal representative of a V.8bis transaction;
  a mechanism at the local gateway for suppressing such detected signaling such that the signaling does not reach the remote gateway, thereby preventing a modem from responding to the V.8bis initiating signal; and
  a mechanism at the local gateway for initiating a modem relay session with the remote gateway;
  wherein the initiating signal is characterized by a dual tone of defined frequency and duration;
  wherein the dual tone is at a frequency of approximately 1375 Hz and 2002 Hz and for a duration of approximately 400 ms.

11. A computer-readable medium containing a program, the program comprising:
  instructions for monitoring a call for signals originating from a first modem and received over a circuit switched network, the signals initiating a predetermined high speed modulation that provides a transfer rate of 32 kb/s or more between the first modem and a second modem;
  instructions for detecting whether the signals include a predetermined dual tone that identifies the signals as negotiating the predetermined high speed modulation, the predetermined dual tone occurring at a frequency of approximately 1375 Hz and 2002 Hz and for a duration of approximately 285 ms to 400 ms and occurring before an answer tone for the monitored call; and
  instructions for blocking the predetermined dual tone from entering the packet switched network to prevent the second modem from responding to the predetermined dual tone thereby preventing the modems from negotiating the predetermined high speed modulation for the monitored call.

12. The computer-readable medium in accordance with claim 11, wherein the monitoring is continued at least until an answer back from an answering station is received by the local gateway.

13. An apparatus for initiating a modem relay session between a local and a remote gateway without V.8bis transaction interference, the apparatus comprising:
  means at the local gateway for monitoring a received call for signals originating from a first modem and received over a circuit switched network;
  means at the local gateway for observing a predetermined dual tone in the signals, the predetermined dual tone occurring at a frequency of approximately 1375 Hz and 2002 Hz and for a duration of approximately 285 ms to 400 ms and occurring before an answer tone for the monitored call and the predetermined dual tone identifying the signals as being a type associated with a predetermined high speed modulation;
  means at the local gateway for suppressing such predetermined dual tone such that the observed predetermined dual tone does not reach the remote gateway, thereby preventing a second modem from responding to the identified signals with a predetermined high speed modulation compatibility response; and
  means at the local gateway for initiating a modem relay session with the remote gateway, the modem relay session operating independently of the predetermined high speed modulation.

14. The apparatus of claim 13, wherein the means for observing operates continuously during a voice mode phase at least until the answer tone is established.

15. The apparatus of claim 13, wherein suppressing such predetermined dual tone prevents further attempts to initiate a V.8bis transaction to identify and select operating modes between the first and second modems.

16. A method of operating a local gateway that separates a circuit switched network and a packet switched network, the method comprising:
  receiving a call originating from a first modem over the circuit switched network;
  transmitting the call over the packet switched network to a remote gateway for forwarding to a second modem that is located in a same or another circuit switched network;
  monitoring the call for signals originating from the first modem and received over the circuit switched network, the signals configured to establish a predetermined high speed mode of operation that operates independently of V.90 and provides a transfer rate of 32 kb/s or more;
  determining whether the signals include a predetermined dual tone that identifies the signals as being configured to establish the predetermined high speed mode of operation, the predetermined dual tone occurring at a frequency of approximately 1375 Hz and 2002 Hz and for a duration of approximately 285 ms to 400 ms and occurring before an answer tone for the monitored call; and
  blocking the predetermined dual tone from entering the packet switched network to prevent the monitored call from operating according to the predetermined high speed mode of operation.

17. The method of claim 16, wherein said monitoring is continued during a voice mode for the call and ends before a modem relay mode for the call.

18. The method of claim 17, wherein said blocking is performed by software implemented in the form of instructions within a program that is contained within a computer-readable medium.

19. The method of claim 18, wherein blocking the signals prevents the first and second modems from engaging in a V.8bis transaction.

20. The method of claim 19, wherein blocking the signals prevents further attempts to initiate a transaction to identify and select operating modes between the first and second modems.

* * * * *